E. A. THURSTON.
BELT FASTENER.
APPLICATION FILED JUNE 9, 1920.

1,392,722.  Patented Oct. 4, 1921.

Inventor
Elmer A. Thurston

UNITED STATES PATENT OFFICE.

ELMER A. THURSTON, OF CHIPPEWA FALLS, WISCONSIN.

BELT-FASTENER.

1,392,722. Specification of Letters Patent. Patented Oct. 4, 1921.

Application filed June 9, 1920. Serial No. 387,712.

*To all whom it may concern:*

Be it known that I, ELMER A. THURSTON, a citizen of the United States, at present residing at Chippewa Falls, in the county of Chippewa and State of Wisconsin, have invented certain new and useful Improvements in Belt-Fasteners, of which the following is a specification.

The improvement relates to that class of inventions found particularly useful for joining the ends of power transmission belts.

My fastener consists of one piece of metal, having numerous spurs which when driven into the adjoining ends of belts are clenched.

I am aware that there are many varieties of one piece metal belt fasteners with spurs, but my fastener is similar in principle only.

To this end, I have designed a belt fastener which can be readily applied to leather, rubber, and fabric belts, without the use of a special machine or device, and without the necessity of removing said belts from shafting and pulleys, yet will hold firmly and with great durability.

Owing to specific and novel arrangement of my fastener, gaping corners of belt ends are eliminated together with their attending objections, such as, pounding against shifter forks with its noise producing and dangerous effects, pulled out, worn and broken parts which cut and wear pulleys and are dangerous to the hands of workmen, the tendency to run crooked over pulleys, and climb the steps of cone pulleys.

With other objects in view that will presently appear, my invention comprises those novel details of construction and combination of parts specifically pointed out in the appended claims and illustrated in the accompanying drawings, in which:

Figure 1:
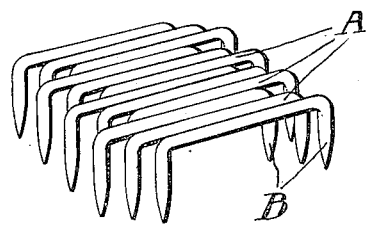
Figure 1 is a general view of fastener before being applied to belt.
Figure 2:
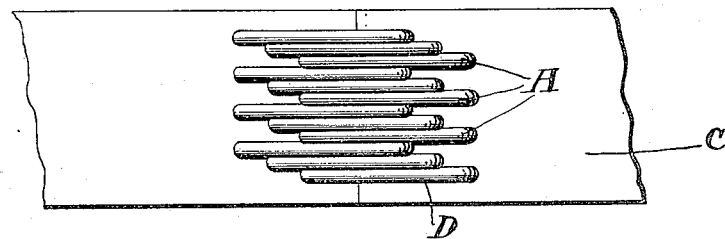
Fig. 2 is a top view of fastener applied to belt.

In the attainment of my object I propose to have more numerous spurs than any belt fastener of which I am aware, said spurs being so distributed in belt ends that every portion of cross section of belt is behind a spur, therefore each spur holds no portion of belt wider than itself, yet by a triple staggered distribution of spurs as shown in Figs. 1 and 2, and their cylindrical section, the belt is not cut or weakened at any place, but maintains its full strength.

There being an equal number of spurs on each side of belt juncture, full width of belt is secured, thus eliminating the gaping corners prevalent in other fasteners, due to the fact that one end of belt has no spurs near its edge.

My fastener to form and purpose, is a parallel joined series of cylindrical wires running across joint, each wire having a spur at either end, said wires by their laterally differing positions terminate to produce the triple staggered effect.

Furthermore owing to the fact that my fastener has comparatively small and numerous spurs, it is possible to cut the fastener exact widths for belt in question thereby obtaining full strength of belt ends, also overcoming the possibility of some of the piercing spurs extending beyond the belt edge, where they are both useless and dangerous.

Figure 3:
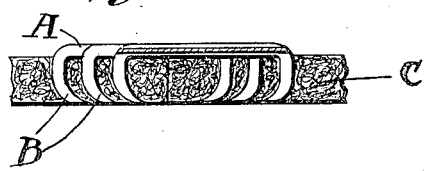
Fig. 3 is a sectional view applied to belt, spurs being clenched.

In Figs. 1—2—3— the triple staggered arrangement and closeness of the cylindrical members are shown by the letters (A), together with their respective spurs as shown by the letters (B).

The spurs being small, cylindrical, and pointed, adapt them to be easily clenched and entirely embedded in belt, and flush with its surface, and remain thus, therefore preventing any wear on themselves or pulleys.

It will be observed in Fig. 2 that the belt (C) is not weakened by spur punctures at any place, and that there is ample belt stock on all sides of spurs.

In Fig. 3 the clenched spurs (B) are shown entirely embedded in belt (C).

Also in Fig. 2 it will be noted that it is possible to fasten belts very close to the edge, at the same time having the spurs both sides juncture (D) an equal distance from belt edge.

Figure 4:
Fig. 4 is an enlarged transverse section of members showing connecting portion of metal.

Fig. 4 shows an enlarged sectional view transversely through members; the joining portion between each cylindrical member is also plainly shown.

By having more and closer spurs my fastener is of particular advantage on woven and fabric belts by binding the loose and open ends of the fibers or threads, which in other fastener are not sufficiently held together, thus allowing belt ends to become frayed and fastener pulling out.

I reserve the right to construct my fastener by either rolling or drawing from one piece the attached cylindrical members, or by making each member separately and joining them by soldering or brazing, the result being identical as to shape, form, and purpose.

It is evident from the foregoing that my fastener makes a safer, stronger and more durable, more compact, lighter in weight, shorter in length, more easily applied, and a more desirable fastener than any of which I am aware.

What I claim is:

1. A metallic belt fastener, consisting of a parallel abutting and joined aggregation of cylindrical members, their axes lying transverse to the belt joint, said members combining with, and embodying staggered spurs, each of said spurs being a continuation of each end of each aforesaid members substantially as shown and described.

2. A metallic fastener comprising a series of double spurred members arranged parallel and joined together, the spurs being curvilinear in cross-section and forming companion pairs of staggered rows.

3. A metallic fastener comprising a body web weakened upon parallel lines to form a series of separable units, each separable unit terminating with companion spurs curvilinear in cross-section and grouped to form oppositely disposed staggered rows.

ELMER A. THURSTON.